March 11, 1969     S. B. MINSKY     3,431,577
WIPER HOUSING DEVICE
Filed Feb. 27, 1968
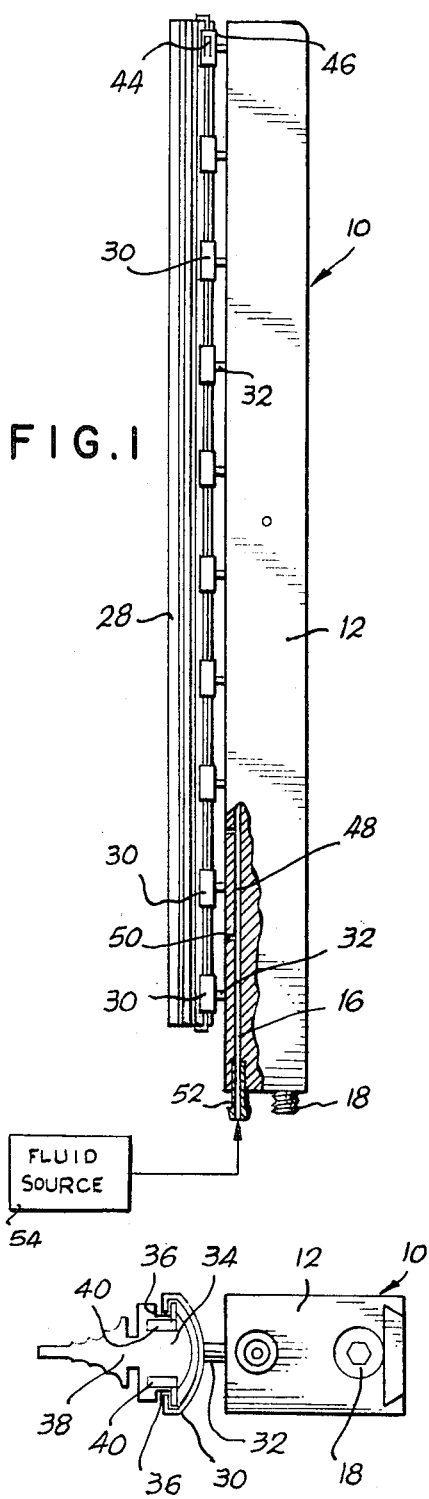
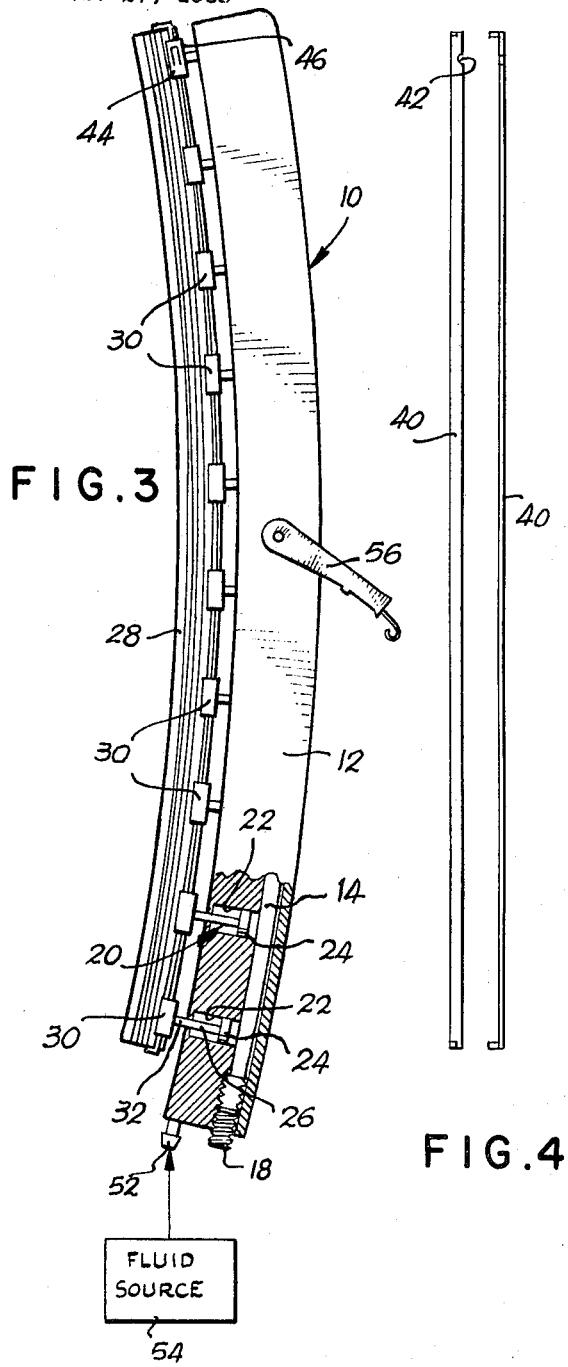
INVENTOR
Semen Boris MINSKI
By Bertram Frank
ATTORNEY

United States Patent Office 3,431,577
Patented Mar. 11, 1969

3,431,577
WIPER HOUSING DEVICE
Semen B. Minsky, 199 Newman St.,
Metuchen, N.J. 08840
Filed Feb. 27, 1968, Ser. No. 708,602
U.S. Cl. 15—250.04       10 Claims
Int. Cl. B60s 1/52, 1/40

ABSTRACT OF THE DISCLOSURE

The present invention relates to a wiper blade housing in which an elongated fluid chamber is provided. A multiplicity of piston bores communicates with the fluid chamber. Each bore has a piston rod which is connected to a wiper blade holding member, to which is releasably mounted a wiper blade. The fluid pressure in the fluid chamber is evenly distributed over each of the multiplicity of piston arrangements so that the pressure exerted on the wiper blade is even along its entire length so that the wiper blade has a constant downward evenly distributed pressure throughout its length. The wiper blades are releasably secured in the holding elements by means of at least one elongated resilient element, the wiper blades being replaceable.

---

This invention relates to window wiper blade housings and more particularly to a wiper blade housing having an even pressure distributed throughout, as well as a means for providing a cleaning fluid distribution therewith.

In cleaning of window panes—manually or mechanically—by means of wiping with the aid of an elastic blade, it is imperative that the entire length of the blades cleaning edge should adhere constantly to the pane irrespectively of the blades movements. This adherence should prevail to any uneven surface topography, as is the case in most window panes having indentations, convexions, or concavities. It is also imperative that every fragment of the cleaning edge should be provided with sensitive pressure mobility and retaining in appropriate pressure position in order to descend into every concave or indentation and ascend above a convex or convolute a sphere bend.

Prior art devices have not performed in accordance with the above prescribed necessaries, thereby creating streaking and inabilities of uniformly cleaning of windows, particularly in automobile wiper arrangements.

It is the general object of the present invention to avoid and overcome the foregoing and other difficulties in and to prior art devices by providing a relatively inexpensive wiper housing which is highly efficient.

Another object of the present invention is to provide a windshield wiper blade housing which will maintain a wiper blade in constant cleaning contact with a surface and provide an even distribution of pressure on the wiper blade.

A further object of the present invention is to provide a means of releasably retaining a wiper blade in the housing means and a quick and easy means of exchanging worn out wiper blades.

Yet another object of the present invention is to combine the action of wiping technique with the use of a window cleaning spray for enhancing the cleaning of the window or other surface.

The objects, above enumerated, and other objects of the present invention which will become apparent as the description proceeds are achieved by providing a wiper blade housing comprising an elongated member having a fluid pressure chamber therein, a wiper blade disposed adjacent said elongated member, a multiplicity of fluid actuated elements disposed in said elongated member, a multiplicity of holding members connectable to said wiper blade, and a multiplicity of pressure exerting members connectable to said holding members and in communication with said fluid actuated element for exerting even and constant pressure throughout the length of the wiper blade regardles of the uneven topography of the surface to be cleaned.

For a better understanding of the present invention reference should be had to the accompanying drawings wherein like numerals of reference indicate similar parts throughout the respective views and wherein:

FIGURE 1 is a side view, partly in section, of the present invention,

FIGURE 2 is an end view of the present invention,

FIGURE 3 is an alternative arrangement of the present invention, and

FIGURE 4 is a pictorial representation of the metal rib showing a top and side view of the same.

Referring now to FIGURES 1 and 3 a wiper blade housing is shown therein and may be generally referred to by the reference numeral 10.

For the sake of simplicity the operation and general description of the present invention will be set forth in relation to a windshield wiper used for cleaning and clearing the windshields of automobiles, however it should be particularly understood that the invention is not limited to that specific application.

A wiper blade housing 12 may be provided having therein an elongated fluid chamber 14, and a second fluid chamber 16. The elongated fluid chamber 14 may be shaped in accordance with the curvature of the housing 12. At one end of elongated fluid chamber 14 there may be provided an adjustable slug 18 which may be removed to insert fluid under pressure such that the internal pressure of the elongated fluid chamber 14 may be altered by moving the slug 18 inwardly, to increase the pressure, or outwardly to reduce the pressure.

Communicating with the elongated fluid chamber 14 there may be provided a plurality of fluid actuated elements 20, such as piston arrangements. Each fluid actuated element 20 is comprised of a bore 22 having a reciprocable piston head 24 disposed therein. Each of the bores 22 are in communication with the elongated fluid chamber 14 such that the internal pressure of the chamber 14 is evenly distributed over the bores 22 and that each bore is subjected to the same pressure. Each piston head 24 has a rod 26 connected thereto which extends outwardly the housing 12 in the direction of a wiper blade 28.

In order to clean a surface (not shown) the wiper blade 28 is provided and may be supported by a multiplicity of holding members 30. Each holding member 30 may be in alignment with each of the rods 26 extending downwardly from the wiper blade housing 12. Manifestly, the piston arrangement or fluid actuated elements 20 are sealed against fluid leakage, in a manner well known to those skilled in the art.

The free end 32 of each rod 26 may be connected to a holding member 30. In this manner a wiper blade 28 may be supported at many points along its length and at each of these points the fluid actuated elements 20 maintain a constant and uniform downward pressure so that the wiper blade 28 is pressed against the surface to be cleaned, uniformly over its length.

In order to permit the retention of the wiper blade 28 by the holding elements 20, as shown in FIGURE 2, the upper portion 34 of each wiper blade 28 may be provided with a pair of channels 36 which run the length of the blade 28. Each holding member 30 is comprised of a clip-like structure for holding the neck portion 38 of the upper portion of the wiper blade 28. In order to releasably secure the wiper blade 28 in the holding elements 30 at least one metal rib 40 may be slid into the holding elements 30 and the channel 36 of the wiper blade 28 until a notch 42 on the metal rib 40 mates with a spring latch 44 on the last holding element 46. In this manner, by using a pair of metal ribs 40, one in each channel 36 of the wiper blade 28, the blade 28 may be releasably secured in the holder elements 30. It may be seen that in order to change a worn blade 28, the metal ribs 40 need only be slid out, releasing the wiper blade, the blade being replaced and the metal ribs 40 being slidable back into its locking position.

In order to provide for the use of a cleaning spray for cleaning the windshield, a second fluid chamber 48 may be provided in the housing 12. A plurality of fluid dispensing apertures 50 may be provided which are in communication with the second fluid chamber 48 such that when fluid is introduced into the second chamber 48 through the nozzle 52, the fluid will be dispensed against the windshield to be cleaned. The nozzle 52 may be connected, through a convenient tube arrangement (not shown), to a fluid source 54 which will supply the fluid, generally a liquid with non-freezing qualities, under pressure to the nozzle 52.

Connected to the upper portion of the wiper blade housing a connector 56 is provided which permits the fastening of the wiper blade housing 12 to a well known oscillating arm (not shown). It may be seen that my disclosed invention may be used with any existing conventional windshield wiper system presently available.

Thus, it may be seen that my invention utilizes a fluid chamber which uniformly distributes even fluid pressure to a multiplicity of piston arrangements which urge a wiper blade 28 against a surface to be cleaned. Most windshields have an uneven topography, however the piston arrangement will permit the extension or retraction of the blade in a small or large, second to maintain the wiper blade in cleaning contact with the surface, and this uneven area will have the same pressure of blade thereagainst as the smooth section of the windshield. This occurs because the fluid, in the elongated fluid chamber, will have the same pressure applied uniformly over the blade since any uneven areas on the surface to be cleaned may raise or lower one of the piston heads but this change in localized pressure will be translated along the entire elongated fluid chamber and will thereby be equalized.

Whether the blade 28 is curved or flat, the principle of operation remains the same, therefore, the alternative structure of FIGURE 3 relates to structure without deviating from the principle of invention.

While in accordance with the patent statutes a preferred embodiment is herein shown and described in detail, it should be particularly understood that the invention is not limited thereto or thereby.

I claim:
1. A wiper blade housing comprising an elongated member having a fluid pressure chamber therein, a wiper blade disposed in spaced relationship to said elongated member, a multiplicity of fluid actuated elements disposed in said elongated member in communication with said fluid pressure chamber, a multiplicity of holding members connectable to said wiper blade, and a multiplicity of pressure exerting members connected to said holding members and in communication with said fluid actuated element for exerting pressure throughout the length of the wiper blade regardless of the uneven typography of the surface to be cleaned.

2. A wiper blade housing according to claim 1 wherein the pressure exerted on said wiper blade is evenly distributed over the length of the blade.

3. A wiper blade housing according to claim 2 wherein there is provided a means for varying the fluid pressure within said fluid chamber to maintain said wiper blade in constant communication with the surface to be cleaned.

4. A wiper blade housing according to claim 2 wherein said wiper blade is held in position within said holding members by means of at least one rib member running the length of said wiper blade, said at least one rib member being insertable between said wiper blade and said pressure distribution elements.

5. A wiper blade housing according to claim 2 wherein said rib member is spring loaded in position to prevent the sliding out of the wiper blade from the holding members.

6. A wiper blade housing according to claim 5 wherein each of said multiplicity of fluid actuated elements is comprised of piston bore in communication with said fluid pressure chamber, a piston head reciprocably mounted within said bore, and a piston rod connected at one end to said piston head extending outwardly of said elongated member and its other end to one of said holding members, said fluid pressure chamber thereby evenly distributing the fluid pressure to each of said pressure distribution elements.

7. A wiper blade housing according to claim 6 wherein said means for varying the fluid pressure with said fluid pressure chamber comprises a slug movably disposed in said fluid pressure chamber and adapted to be moved inwardly to increase the fluid pressure or outwardly to reduce the fluid pressure thereby exerting more or less pressure on the wiper blade against the surface to be cleaned.

8. A wiper blade housing according to claim 7 wherein said multiplicity of piston rods exert even and constant pressure along the length of the wiper blade regardless of the typography of the surface to be cleaned.

9. A wiper blade housing according to claim 1 wherein a second fluid chamber is disposed in said housing having a multiplicity of apertures in communication with said second fluid chamber for dispensing fluid against the surface to be cleaned, said second fluid chamber being connectable to a source of fluid.

10. A wiper blade housing according to claim 8 wherein a second fluid chamber is disposed in said housing having a multiplicity of apertures in communication with said second fluid chamber for dispensing fluid against the surface to be cleaned, said second fluid chamber being connectable to a source of fluid.

References Cited
UNITED STATES PATENTS

| | | | |
|---|---|---|---|
| 3,006,018 | 10/1961 | Golub et al. | 15—250.42 |
| 3,058,141 | 10/1962 | Christen | 15—250.2 |
| 3,233,273 | 2/1966 | Anderson | 15—250.42 |
| 3,371,368 | 3/1968 | Walker | 15—250.04 |

PETER FELDMAN, *Primary Examiner.*

U.S. Cl. X.R.

15—250.42